Patented Apr. 11, 1950

2,503,641

UNITED STATES PATENT OFFICE 2,503,641

DEHYDROGENATION OF ORGANIC COMPOUNDS

Arthur William Charles Taylor, Harry Norman Rose, and Thomas Alderson, Norton-on-Tees, England, assignors to Imperial Chemical Industries Limited, a corporation of Great Britain No Drawing. Application March 23, 1948, Serial No. 16,626. In Great Britain April 9, 1947

4 Claims. (Cl. 260—621)

This invention relates to the dehydrogenation of organic compounds to produce the corresponding phenols.

We have found that phenols can be produced by the dehydrogenation, in the presence of a catalyst consisting of or comprising a metal of the platinum group, in the metallic state, of an organic compound having at least one ring containing six carbon atoms, one of the said carbon atoms having attached thereto a keto oxygen atom or a hydroxyl group, at least two of the said carbon atoms being saturated with respect to hydrogen, the dehydrogenation being carried out at elevated temperature and in the presence of added hydrogen.

Examples of organic compounds suitable for use in the process of the present invention are cyclohexanol, cyclohexanone, tetrahydro-alpha-naphthalone and their substituted derivatives, substituent groups which may be present being lower alkyl groups such as methyl or ethyl groups, nitrile groups (—CN) and ester groups (—COOR) where R is a lower alkyl group.

The catalyst may consist of or comprise one or more of the metals platinum, palladium, rhodium, osmium, iridium or ruthenium. Of these metals, platinum and palladium have been found particularly suitable. The metals may be supported on any convenient support such as pumice, kieselguhr, or silica gel. Satisfactory results are obtained with supported catalysts containing about 5% by weight of the platinum metal, although higher or lower proportions of the platinum metal may be used if desired. We have found it particularly advantageous to use as a catalyst a platinum metal supported on activated carbon and more particularly to use platinum or palladium supported on granular activated carbon.

Suitable supported catalysts may be prepared by any convenient method, for example granules of activated carbon may be impregnated with a solution of platinic chloride in hydrochloric acid and, after drying, heated at a temperature in the range of from 300° to 600° C., preferably in the presence of hydrogen: a temperature of about 350° to 500° C. is satisfactory. It is convenient to carry out this heating step in the vessel in which the dehydrogenation is to be carried out.

If desired, the catalysts used in the process of the present invention can be reactivated, without removing them from the reaction vessel, by heating them at a suitably elevated temperature in the presence of hydrogen. In general a suitable temperature is 20° to 30° C. above that at which the process has been operated.

The dehydrogenation may be carried out satisfactorily at temperatures within the range of from 250° to 400° C., although higher or lower temperatures may be used if desired.

The partial pressure of the added hydrogen may vary within wide limits, but it should not be so high as to cause hydrogenation to predominate over dehydrogenation. Satisfactory results are obtained with a molecular ratio of added hydrogen to compound being dehydrogenated of 1:1.

We have also found that in general it is desirable for the organic compound to have a short time of contact with the catalyst in the reaction space. This time of contact may be varied by varying the rate of feeding the organic compound through the reaction space. It will be understood that with a given set of reaction conditions the rate of feeding the organic compound through the reaction space should be as high as possible, compatible with the production of a satisfactory reaction product, for example with respect to its content of the desired phenol and the ease with which the phenol can be separated from the remaining reaction products. More particularly, in the production of phenol from cyclohexanone or cyclohexanol, if very high rates of feeding are used, excessive amounts of unreacted material are contained in the reaction product, from which it is difficult to separate the phenol. When dehydrogenating cyclohexanone using a platinum catalyst supported on activated carbon, a feed rate of about 7.0 kg. of liquid per litre of catalyst volume per hour gives satisfactory results. Using the same catalyst and cyclohexanol a feed rate of 4.0 kg. of liquid per litre of catalyst volume per hour is satisfactory.

A short time of contact between the organic compound and the catalyst may also be obtained by providing for the presence of a diluent gas with the organic compound to be dehydrogenated, whereby the yield of the desired phenol is enhanced. This diluent gas may be an inert gas such as nitrogen, but it is preferable to use hydrogen alone as the diluent gas, so that the hydrogen liberated in the process remains substantially uncontaminated with other gases and may be withdrawn from the reaction zone and used in processes in which the use of substantially pure hydrogen is advantageous.

As hereinbefore stated, when using metals of the platinum group as catalysts it is convenient to distribute them in finely divided form on a suitable support such as pumice, kieselguhr, silica gel, alumina gel, and activated carbon. However, when these supported catalysts are used in the process of the present invention there is a tendency for dehydration to occur in addition to dehydrogenation. It is believed that this dehydration reaction is catalysed by the supports, and in particular by those supports containing substances which are known to catalyse dehydration reactions, such as silica, alumina, and compounds thereof.

The use of catalysts comprising metals of the platinum group carried on a support therefor may be disadvantageous when dehydrogenating oxygen-containing organic compounds, in that initial organic compound tends to be converted into an undesired product such as the corresponding hydrocarbon, which usually requires to be separated from the reaction product and which may even be difficult to separate.

We have now found that in the dehydrogenation of oxygen-containing organic compounds at elevated temperature in the presence of a catalyst comprising a metal of the platinum group, in the metallic state, and a support, the tendency for the dehydrogenation reaction to be accompanied by a dehydrating reaction is decreased or even substantially completely inhibited if an alkali metal compound is also present in the catalyst.

As a further feature of the present invention therefore, there is provided an improved catalyst suitable for use in the process which comprises a metal of the platinum group, in the metallic state, a support and alkali metal compound.

The alkali metal compound may be initially present in the catalyst as the hydroxide for example of sodium or potassium, or it may be present as an alkali metal salt which may be the carbonate or chloride, or as an alkali metal salt of an organic acid.

The quantity of alkali metal compound present in the catalyst may vary within wide limits, the optimum quantity for the dehydrogenation of a given organic compound under given conditions being easily determined by simple preliminary experiments.

Satisfactory results have been obtained in the dehydrogenation of cyclohexanol to phenol when using a supported platinum-containing catalyst in which initially alkali-metal carbonate, for example potassium carbonate, was present to the extent of about 40% to 100% by weight of the platinum compound present.

When provision is made for the presence of an alkali metal compound in the catalyst, any suitable support may be used, but preferred supports are pumice, kieselguhr, or activated carbon, the latter being particularly satisfactory. When preparing the catalysts according to this feature of the invention it is desirable to take into consideration the alkali metal content of the support to be used, so that the quantity of alkali metal compound in the final catalyst may be adjusted to the desired value. In some cases it may be desirable to treat the support for the removal of alkali metal, for example by treating it with dilute acid such as hydrochloric acid, followed by washing with water, to obtain a support substantially free from alkali metal, whereby in the subsequent preparation of the catalyst, control of the content of alkali metal compound is facilitated. Such treatment also has the advantage that it may remove from the support other substances which have a deleterious effect on activity of the catalyst.

We have found that a particularly active form of catalyst comprises metallic platinum and an alkali metal compound supported on activated carbon. It is desirable, in this preferred catalyst, to use an activated carbon which has been treated with dilute hydrochloric acid for the removal of alkali.

The process of the present invention is illustrated by the following examples, in which the percentage conversion is the percentage by weight of starting material destroyed, and the yield is the percentage by weight of desired material obtained related to the amount theoretically obtainable from the starting material destroyed.

Example 1

A catalyst consisting of activated carbon containing 5.3% by weight of platinum was activated by heating it at a temperature of 400° C. in a stream of hydrogen for 36 hours. Cyclohexanol containing 5% of water was then passed over the catalyst at a rate of 3.70 kg. per litre of catalyst volume per hour together with hydrogen in the proportion of 1 mole of hydrogen per mole of cyclohexanol. The product was found to contain 78.2% of phenol, 2.7% cyclohexane, 11.9% water and 7.1% of benzene, all these percentages being by weight, representing a conversion of 97% and a yield of 87.7%. In this example, in calculating the percentage conversion, the cyclohexanone in the product has been regarded as unchanged feed material, i. e. material from which phenol is potentially available.

Example 2

A catalyst consisting of activated carbon containing 5% by weight of platinum was activated by heating it for 48 hours at about 350° C. in a stream of hydrogen. Cyclohexanone containing 6.5% by weight of water was passed at a rate of 7.00 kg. per litre of catalyst volume per hour, together with added hydrogen in the proportion of 1 mole of hydrogen to 1 mole of cyclohexanone and nitrogen in the proportion of 0.5 mole per mole of cyclohexanone, over the catalyst activated as above described, while maintaining the temperature of about 350° C. The liquid reaction product contained 74% phenol, 10.2% cyclohexanone, 8.65% water, 7.0% benzene, all percentages being by weight, representing a conversion of cyclohexanone feed of 89.2% and a yield of phenol of 98% of the cyclohexanone converted.

Example 3

A mixture containing 90% by weight of tetrahydro-alpha-naphthalone and 10% by weight of tetrahydro-naphthalene was passed at a rate of 2.98 kg. per litre of catalyst volume per hour, together with added hydrogen in the ratio of 1 mole of hydrogen to 1 mole of tetrahydro-alpha-naphthalone, over a catalyst as described in Example 2, the temperature being maintained at about 355° C. The product contained, by weight, 25% alpha-naphthol, 25% naphthalene, 10% tetrahydro-naphthalene, 38% tetrahydro-alpha-naphthalone and 2% water, representing a conversion of tetrahydro-alpha-naphthalone of about 50% and a yield of about 50% of alpha-naphthol on the tetrahydro-alpha-naphthalone converted.

Example 4

Cyclohexanone containing 6.0% by weight of water was passed at a rate of 3.42 kg. per litre of catalyst volume per hour, together with added hydrogen in the proportion of 1 mole of hydrogen to 1 mole of the cyclohexanone, over a platinum-on silica gel catalyst, the temperature being maintained at 350° C. The catalyst contained 5.0% by weight of platinum. The product contained, by weight, 48.5% of phenol, 27.0% of cyclohexanone, 11.0% of water and 12.3% of benzene.

Example 5

100 gm. of granular active carbon which had been washed with dilute hydrochloric acid was impregnated with an aqueous solution containing 1% by weight of hydrochlorplatinic acid to give a catalyst containing approximately 5% platinum. After drying the impregnated active carbon for twenty-four hours at 110°–120° C. it was treated with a 5% solution of potassium carbonate to give a finished catalyst containing 2% by weight of potassium carbonate. The catalyst was then dried for twenty-four hours at 110°–120° C. and was reduced immediately before use by heating at 400° C. in the presence of hydrogen. Cyclohexanol containing 1.3% by weight of water was passed over this catalyst at a rate of 3.84 kg. per litre of catalyst volume per hour, together with added hydrogen in the ratio of 1 mole of cyclohexanol per mole of hydrogen, the catalyst being maintained at a temperature of 400° C. The product contained 92.8% of phenol, 3.1% of cyclohexanone, 1.0% of water and 1.5% of benzene, all percentages being by weight, representing a conversion of 100% and a yield of phenol of 96.4%.

Example 6

For the purpose of comparing with the results obtained in Example 5 a catalyst containing 5.1% by weight of platinum supported on activated carbon which had been washed with dilute aqueous hydrochloric acid and substantially no alkali metal, was activated by heating it at a temperature of 400° C. in a stream of hydrogen for 36 hours. Cyclohexanol containing 1.3% of water was then passed over the catalyst at a rate of 3.82 kg. per litre of catalyst volume per hour together with hydrogen in the proportion of 1 mole of hydrogen per mole of cyclohexanol the temperature of the catalyst being maintained at 400° C. The product was found to contain 88.6% phenol, 1.9% cyclohexanone, 1.7% of water and 4.4% of benzene, and 3.5% of cyclohexanol, all these percentages being by weight representing a conversion of 96.5% and a yield of phenol of 93.7%.

Example 7

This example describes a process for the production of a suitable catalyst, in which the alkali metal compound was added after the reduction step.

100 gm. of granular active carbon which had been washed with dilute hydrochloric acid was impregnated with an aqueous solution containing 1% by weight of hydrochlorplatinic acid to give a catalyst containing 5.1% platinum. The impregnated active carbon was dried at 110°–120° C. for twenty-four hours, and then reduced at 400° C. in an atmosphere of hydrogen for 36 hours. When reduction was complete, the catalyst was cooled down in an atmosphere of nitrogen and then treated with an aqueous solution containing 8% by weight of potassium carbonate, to give a catalyst containing 2% by weight of potassium carbonate, the potassium carbonate being equal to 40% of the platinum content of the catalyst. The catalyst was then dried at 110°–120° C. for twenty-four hours.

We claim:

1. A vapor phase process for the production of phenols which comprises the steps of dehydrogenating in the presence of a catalyst comprising a platinum group metal in the metallic state and an alkali metal compound, an organic compound having at least one ring containing six carbon atoms, one of the said carbon atoms having attached thereto a substituent selected from the group consisting of a keto oxygen atom, a hydroxyl group, at least two of the said carbon atoms being saturated with respect to hydrogen, the dehydrogenation being carried out at elevated temperature and in the presence of added hydrogen.

2. A vapor phase process for the production of phenols which comprises dehydrogenating an organic compound having at least one ring containing six carbon atoms, one of the said carbon atoms having attached thereto a substituent selected from the group consisting of: a keto oxygen atom, a hydroxyl group; at least two of the said carbon atoms being saturated with respect to hydrogen, the hydrogenation being carried out at a temperature in the range 250° to 400° C., in the presence of added hydrogen and of a catalyst consisting essentially of: metallic platinum, activated carbon, and an alkali metal compound, the platinum being present to the extent of 5% by weight of the total weight of the catalyst.

3. A vapor phase process for the production of phenols which comprises dehydrogenating an organic compound having at least one ring containing six carbon atoms, one of the said carbon atoms having attached thereto a substituent selected from the group consisting of a keto oxygen atom and a hydroxyl group, at least two of the said carbon atoms being saturated with respect to hydrogen at a temperature in the range of 250° to 400° C. in the presence of added hydrogen and a catalyst comprising metallic platinum, activated carbon and an alkali metal compound, the platinum comprising 5% of the total weight of the catalyst, the quantity of alkali metal compound being equal to 40% to 100% by weight of platinum present.

4. A vapor phase process for the production of phenols which comprises dehydrogenating an organic compound having at least one ring containing six carbon atoms, one of the said carbon atoms having attached thereto a substituent selected from the group consisting of a keto oxygen atom and a hydroxyl group at elevated temperature in the presence of added hydrogen and a catalyst comprising a platinum group metal and activated carbon, the said activated carbon having been treated for the removal of at least part of its alkali metal content, and having had subsequently added thereto sufficient alkali metal carbonate to provide free alkali.

ARTHUR WILLIAM CHARLES TAYLOR.
HARRY NORMAN ROSE.
THOMAS ALDERSON.

REFERENCES CITED

The following references are of record in the file of this patent:

UNITED STATES PATENTS

| Number | Name | Date |
|---|---|---|
| 2,291,585 | Bartlett et al. | July 28, 1942 |
| 2,321,551 | Loder | June 8, 1943 |

OTHER REFERENCES

Linstead et al., Jour. Chem. Soc. (1940) pages 1134–39.

Sabatier et al., Comptes Rendus, vol. 168, 670–2.

Balandin, Chem. Abs., vol. 27, 5593 (1933).